(12) United States Patent
Olsen et al.

(10) Patent No.: US 10,598,300 B2
(45) Date of Patent: Mar. 24, 2020

(54) PROTECTING SUBSEA STRUCTURES

(71) Applicant: Subsea 7 Norway AS, Stavanger (NO)

(72) Inventors: Christian Linde Olsen, Stavanger (NO); Pavlos Vardoulakis, Stavanger (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 15/576,838

(22) PCT Filed: May 20, 2016

(86) PCT No.: PCT/EP2016/061491
§ 371 (c)(1),
(2) Date: Nov. 26, 2017

(87) PCT Pub. No.: WO2016/188923
PCT Pub. Date: Dec. 1, 2016

(65) Prior Publication Data
US 2019/0011062 A1    Jan. 10, 2019

(30) Foreign Application Priority Data
May 26, 2015    (GB) .................................. 1508946.9

(51) Int. Cl.
*F16L 1/16*    (2006.01)
*F16L 1/20*    (2006.01)
*F16L 1/11*    (2006.01)
*F16L 1/12*    (2006.01)
*E21B 41/00*   (2006.01)

(52) U.S. Cl.
CPC .......... *F16L 1/123* (2013.01); *E21B 41/0007* (2013.01)

(58) Field of Classification Search
CPC .................................... F16L 1/11; F16L 1/123
USPC ................................................... 405/157, 172
See application file for complete search history.

(56) References Cited

U.S. PATENT DOCUMENTS

| 3,793,845 A | | 2/1974 | Keith | |
|---|---|---|---|---|
| 4,171,174 A | * | 10/1979 | Larsen | E02B 3/04 405/157 |
| 4,338,045 A | * | 7/1982 | Cour | F16L 1/20 138/105 |

(Continued)

FOREIGN PATENT DOCUMENTS

| CN | 104196038 | 12/2014 |
|---|---|---|
| GB | 2 084 286 | 4/1982 |

(Continued)

OTHER PUBLICATIONS

Musarra, Sarah Parker, "Concrete mattresses offer more than just pipeline protection," Offshore Engineer, Sep. 1, 2013 (www.oedigital.com/subsea).

(Continued)

*Primary Examiner* — Frederick L Lagman
(74) *Attorney, Agent, or Firm* — Levy & Grandinetti

(57) ABSTRACT

A protective cover for a subsea elongate element, such as a pipeline, has an open end and a barrier attached to a cover to extend across and close an open end. The barrier is flexible to conform to and surround an elongate element extending from under the cover and protruding through the barrier. This prevents rocks of a rock berm from getting under the cover through the open end.

15 Claims, 7 Drawing Sheets

(56) References Cited

U.S. PATENT DOCUMENTS

| | | | | |
|---|---|---|---|---|
| 4,469,469 A | * | 9/1984 | Kennedy, Jr. | F16L 58/12 138/DIG. 6 |
| 4,477,206 A | * | 10/1984 | Papetti | F16L 1/123 405/172 |
| 5,052,859 A | * | 10/1991 | Miller | E02B 3/12 405/157 |
| 5,160,218 A | * | 11/1992 | Hill | F16L 1/24 405/157 |
| 5,193,937 A | * | 3/1993 | Miller | E02B 3/127 405/157 |
| 6,273,641 B1 | * | 8/2001 | Bull | F16L 1/123 405/157 |
| 6,439,808 B1 | * | 8/2002 | Smidt | F16L 1/123 405/157 |
| 6,682,103 B1 | * | 1/2004 | Poirier | H02G 9/02 285/146.1 |
| 7,070,360 B2 | * | 7/2006 | Ellingsen | E21B 33/037 405/157 |
| 8,702,347 B2 | * | 4/2014 | Manimala | F16L 1/123 405/157 |
| 2010/0086363 A1 | | 4/2010 | Manimala | |
| 2013/0022399 A1 | | 1/2013 | Pierce, Jr. | |
| 2015/0068759 A1 | | 3/2015 | Harbison et al. | |
| 2018/0128401 A1 | * | 5/2018 | Schaefer, Jr. | F16L 57/00 |

FOREIGN PATENT DOCUMENTS

| | | |
|---|---|---|
| GB | 2 247 507 | 3/1992 |
| NO | 307002 B1 | 1/2000 |
| NO | 20130296 A1 | 2/2013 |
| WO | WO 79/00109 | 3/1979 |
| WO | WO 98/29611 | 7/1998 |
| WO | WO 99/50581 | 10/1999 |
| WO | WO 02/076821 | 10/2002 |
| WO | WO 2011/144902 | 11/2011 |

OTHER PUBLICATIONS

WateReuse Association White Paper, "Desalination Plant Intakes—Impingement and Entrainment Impacts and Solutions," Jun. 2011.

David J. Chamizo et al., "Rock Berm Design for Pipeline Stability," Proceedings of the ASME 2012 31st Int'l Conference on Ocean, Offshore and Arctic Engineering, OMAE2012-83551, Rio de Janeiro, Brazil, Jul. 2012.

* cited by examiner

PROTECTING SUBSEA STRUCTURES

This invention relates to the mechanical protection of subsea structures, in particular elongate elements laid on the seabed in shallow seas. Examples of such elements are rigid or flexible pipelines, umbilicals and cables as used in the subsea oil and gas industry.

In the context of the invention, 'shallow' means that the seabed is close enough to the surface as to be influenced, at least occasionally, by near-surface sea movement such as wind-driven movement. For illustration but without limitation, depths of up to, say, 90 to 100 metres may therefore be considered shallow in some sea areas. An example of particular relevance to the subsea oil and gas industry is the North Sea.

When laid on the seabed in shallow seas, elongate subsea elements such as pipelines, umbilicals and cables commonly require protection against damage from dropped objects or overtrawling. Protection may be provided along substantially all or only a part of the length of a subsea element, for example near a surface platform, or in an area where fishing vessels are likely to operate.

In shallow seas, lightweight elongate elements are also susceptible to movement across the seabed due to sea movement, particularly during exceptional storms or under rapid tidal flow.

Conventional subsea protection solutions include burying an elongate element in a trench or placing concrete mattresses or dumping a berm of crushed graded rock fragments over an elongate element previously laid on the seabed. These solutions anchor the elongate element to the seabed and particularly resist lateral movement of the element, hence stabilising the element in addition to protecting it. An example of an anchoring solution for an elongate element is disclosed in U.S. Pat. No. 3,793,845.

Whilst it is desirable to limit or control movement of an elongate element across the seabed, a lack of compliance is disadvantageous where the element needs some freedom of movement. A prime example is where the element carries hot or cold fluids in use and so has to handle the expansion and contraction of thermal cycling. In these circumstances, a rigidly-constrained element would impart enormous loads to tie-in support structures and could itself buckle under such loads.

Also, sliding movement of an elongate element relative to the rocks of a surrounding static berm could damage a protective or insulative sleeve or coating of the element. This could lead to corrosion of the element or undermine thermal insulation of hot or cold fluids that the element carries in use.

Where an elongate element is likely to move considerably in service due to thermal fluctuations or sea movement, it is preferred to protect the element with a cover system that maintains a clearance gap around the element. The cover system bears against the seabed on opposite sides of the element and bridges over the element to protect it from damage. The clearance gap allows the element to move relative to the cover system and the seabed, and to do so without suffering damage from contact with a rock berm. Yet, to stabilise the element, lateral movement of the element is limited by the sides of the cover system so that excessive lateral movement is prevented. For example, as is described in WO 99/50581, the clearance between the pipeline and the protective cover may be at least partially filled with insulation material, which restricts lateral movement of the pipeline.

In practice, cover systems may be used in combination with concrete mattresses or rock-dumping. For example, cover systems may be used to cover curved tie-back loops where thermal cycling causes the most lateral movement of the elongate element. The other, more conventional subsea protection systems may be used at less demanding locations along the same element.

Cover systems typically comprise one or more cover units. Multiple cover units may be connectable to each other in series as an assembly to define a cover system of any desired length. The cover units may be made of steel, concrete or a reinforced polymer composite such as GRP (glass-reinforced plastics) or other fibre-reinforced plastics.

Where cover units are of lightweight material such as GRP, ballast weights are typically added to ease installation of the cover units in sea water. Also, rock dumping is used after installation of the cover units on the seabed to stabilise them against sliding or overturning and to add further protection.

Additional examples of protective covers for cables are disclosed in WO 2011/144902, WO 98/29611 and US 2010/086363. WO 79/00109 discloses an example of a protective foldable mattress. An example of a concrete cover structure is disclosed in GB 2345198, but this is used to manage crossing of lines: it is too complex and expensive for simple protection duties.

WO 02/076821 discloses an impact protection system comprising overlapping panels anchored to the seabed and covering the pipeline. Flotation devices are attached to the panels to provide buoyancy to the system. The speed of falling items striking the system, and the associated damage caused, is thereby reduced.

Further to illustrate the prior art, reference is now made to FIGS. 1 to 5 of the accompanying drawings. FIG. 1 shows two cover units 10, 12 that are used together to protect an elongate subsea element. An example of such an element is a subsea pipeline 14 shown lying on the seabed 16 in FIG. 2 after pre-installation. FIG. 3 shows the cover units 10, 12 laid together on the seabed 16 over the pre-installed pipeline 14 to form part of a known cover system 18. FIGS. 4 and 5 show the cover system 18 partially buried by a berm 20 of crushed rock for stabilisation and additional protection.

The cover units 10, 12 shown in FIG. 1 are moulded largely of GRP and are stackable with like units for ease of storage and transportation. Indeed, conveniently, a group of the main cover units 10 may be lowered to the seabed 16 in a stack before the cover system 18 is assembled underwater from those units 10 over a pre-installed elongate element such as the pipeline 14 that can be seen in FIGS. 2 to 5.

The main cover unit 10 shown in FIG. 1 is one of several identical units that fit together with adjoining units 10 in successively overlapping relation to form a longitudinal series along the path of the pipeline 14. An end unit 12 also shown in FIG. 1 is placed at one end of the longitudinal series in overlapping relation with the last of the main cover units 10 at that end. A nearly-identical end unit of slightly different dimensions is similarly placed at the other end of the longitudinal series of main cover units 10. Thus, the full cover system 18 will comprise several main cover units 10 and two end units, one of which is the end unit 12 and the other of which is very similar to the end unit 12.

The main cover unit 10 and the end unit 12 shown in FIG. 1 have various features in common. For example, each unit 10, 12 has lifting points 22 and ballast weights 24. Each unit 10, 12 further comprises an arched body 26 that defines a hollow interior dimensioned to provide substantial clearance all around the pipeline 14 after installation of the cover system 18 over the pre-installed pipeline 14 on the seabed 16. Once the units 10, 12 are installed to form the cover system 18, the hollow interiors of their successive bodies 26 conjoin as a long open-ended tube to form a continuous elongate part-cylindrical tunnel extending across the seabed 16 around and along the pipeline 14.

For ease of illustration, the pipeline 14 and hence the cover system 18 are shown as being straight in the accompanying drawings but they could be curved. This is because the cover system 18 provides for optional articulation between adjoining overlapping cover units 10, 12. Thus, the cover system 18 can follow a curved path if curvature of the pipeline 14 so dictates.

For the purpose of articulation, the main cover unit 10 shown in FIG. 1 has dome-like part-spherical bulges 28, 30 at each end of its body 26. A large bulge 28 at one end of the body 26 has a slightly greater radius of curvature than a small bulge 30 at the other end of the body 26. This is to allow the small bulge 30 of one cover unit 10 to fit under the large bulge 28 of an adjoining cover unit 10 in a longitudinal series of such units 10. Thus interlocked in overlapping relation, the adjoining cover units 10 can adopt various relative angular positions in a horizontal plane with respect to a mutual vertical axis extending through the cooperating bulges 28, 30.

Similarly, the end unit 12 also shown in FIG. 1 has a bulge 32 at one end. The bulge 32 is of similar dimensions to the small bulge 30 at one end of the main cover unit 10, so as to fit under the large bulge 28 at the other end of the main cover unit 10. This is best appreciated in FIG. 5, which is a sectional side view of the assembly of the end unit 12 with the main cover unit 10 over a pipeline 14.

The arched bodies 26 of the main cover unit 10 and the end unit 12 are each flanked to both sides by integral foundation parts 34 extending radially from the base of the body 26. The foundation parts 34 are flat, flange-like lateral projections that extend in a common plane so as to lie flat upon the seabed 16, like feet, upon installation of the units 10, 12.

The foundation parts 34 of the units 10, 12 support the cover system 18 on a soft seabed 16. They also facilitate stabilisation of the cover system 18 by rock-dumping. In this respect, FIG. 4 shows a berm 20 of crushed rocks dumped along both sides of the cover system 18. Thus, the foundation parts 34 extending outwardly from the bodies 26 of the units 10, 12 are sandwiched between the berm 20 and the seabed 16. The weight of the berm 20 therefore presses the foundation parts 34 against the seabed 16 and so stabilises the cover system 18 against movement relative to the seabed 16.

The berm 20 extends from the seabed 16 like a ramp to lie against the arched bodies 26 of the units 10, 12, extending at least partially up the sides of the bodies 26 for additional protection against overtrawling impacts as shown. Any protruding parts of the cover system 18 are smooth and rounded to reduce the risk of snagging by fishing nets. The berm 20 may also extend beyond an open end of the cover system 18.

When harsh weather conditions are experienced in shallow water, it has been discovered that wave-induced water flow may cause water to flow very rapidly along the interior of the cover system 18 between its open ends. In other words, a tunnel effect causes water to rush along the gap between an elongate element such as a pipeline 14 and the cover units 10, 12 that protect it.

As FIG. 5 shows, the hydrodynamic forces of this rapid flow may destabilise and initiate a collapse of the berm 20 around the open end of the end unit 12. The flow then drags loose rocks 36 from the berm 20 inside the cover system 18 though the open end. This is similar to a sand flow in a tunnel.

It will be evident that relative movement between the pipeline 14 and loose rocks 36 inside the cover system 18 may damage the pipeline 14. Such relative movement may be caused by continued movement of the rocks 36 along the interior of the cover system 18 due to the internal water flow or by movement of the pipeline 14 relative to such rocks 36 trapped within the cover system 18. Rocks 36 trapped between the cover system 18 and the pipeline 14 could even jam essential movement of the pipeline 14 with respect to the cover system 18.

In order to mitigate these risks, the invention contemplates a barrier for an open end of a subsea cover system, which barrier is designed to prevent rocks entering the cover system through the open end. The invention is based on the insight that what appears to be the straightforward solution of a simple barrier across the open end, such as a plate or grating with a pre-cut hole or slot for the elongate element to be protected, is in fact entirely unworkable. This is because there is a need to allow for substantial tolerances in the relative positions of an elongate element and the cover system that protects it. There is also a need to allow the elongate element to move laterally within the cover system. A simple barrier must therefore leave gaps around the elongate element to allow the elongate element to move in this way. Rocks can enter the cover system through such gaps, hence defeating the purpose of the barrier.

Against this background, the invention resides in a rigid free-standing protective cover for a subsea elongate element such as a pipeline. The cover has an open end and a barrier attached to the cover to extend across and close the open end. The barrier is flexible to conform to and surround an elongate element extending from under the cover and protruding through the barrier. This prevents rocks of a rock berm from getting under the cover through the open end.

Preferably, the barrier comprises at least one drapable sheet, net or mesh attached to the cover around the open end. So, for example, the invention provides a cover for a subsea elongate structure laid on the seabed, which cover comprises a main cover structure over the elongate structure, openings at two ends of the cover structure for passage of the elongate structure, and at least one net at least partially covering at least one opening of the cover, designed to retain rocks. In another example, the barrier comprises at least one curtain of fingers extending across the open end.

It is also preferred that the barrier extends beyond a boundary of the open end. This defines an anchor portion of the barrier, which anchor portion is arranged to lie on an area of seabed adjacent to the open end.

The inventive concept extends to a subsea installation comprising the cover of the invention in combination with an elongate element. The elongate element extends along and is protected under the cover and that protrudes through the barrier. The installation suitably further comprises a rock berm atop or beside the cover, which berm extends onto an anchor portion of the barrier that lies on an area of seabed adjacent to the open end.

The inventive concept further includes a method of protecting a subsea elongate element. The method comprises: installing a rigid free-standing protective cover on the seabed over the element pre-installed on the seabed, with the element protruding from an open end of the cover; and conforming a flexible barrier with the element protruding through the barrier, the barrier surrounding the element and closing the open end of the cover. The cover is preferably installed on the seabed with the barrier already attached to the cover.

Next, a rock berm may be placed atop or beside the cover, the rock berm extending onto an anchor portion of the barrier that lies on an area of seabed adjacent to the open end.

In use, the element can be allowed to move laterally under the barrier while the flexible barrier continues to conform with and surround the element.

In preferred embodiments, therefore, the invention provides a method of protecting a subsea elongate structure laying on the seabed. The method comprises: lowering a cover of the invention from the surface and over the elongate structure; arranging at least one net around the passage of the elongate structure through the cover; and dumping rocks on parts of the cover.

To exemplify the prior art, reference has already been made to FIGS. 1 to 5 of the accompanying drawings, in which.

Figure 1:
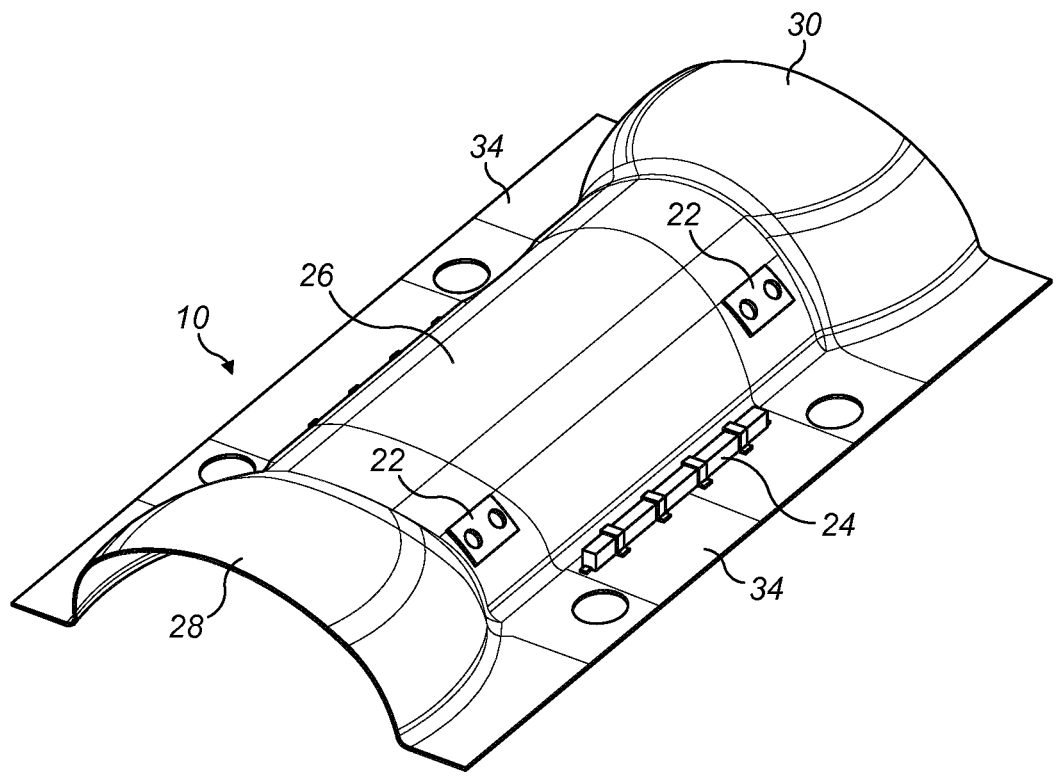
FIG. 1 is a perspective view of two cover units known in the prior art that are used together to protect an elongate subsea element.
Figure 1:
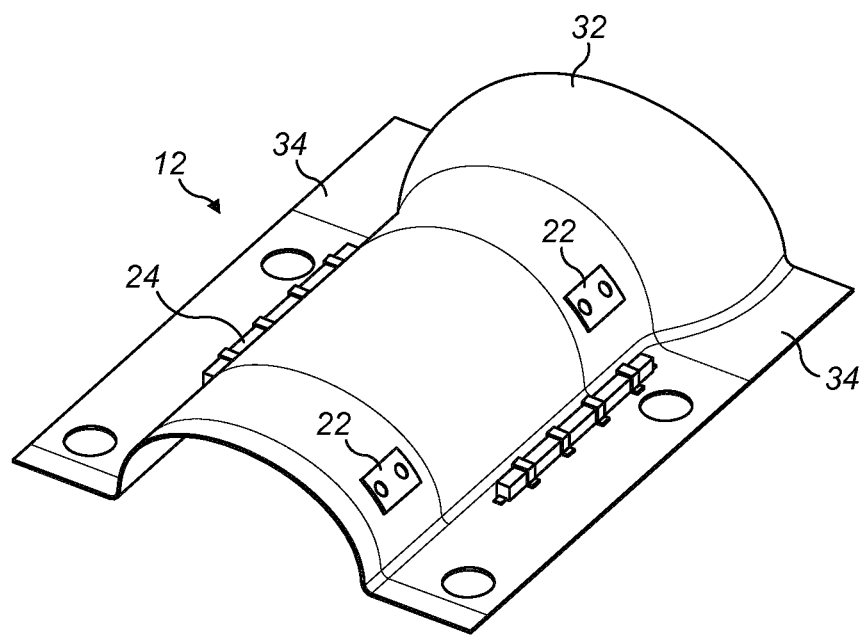
Figure 2:
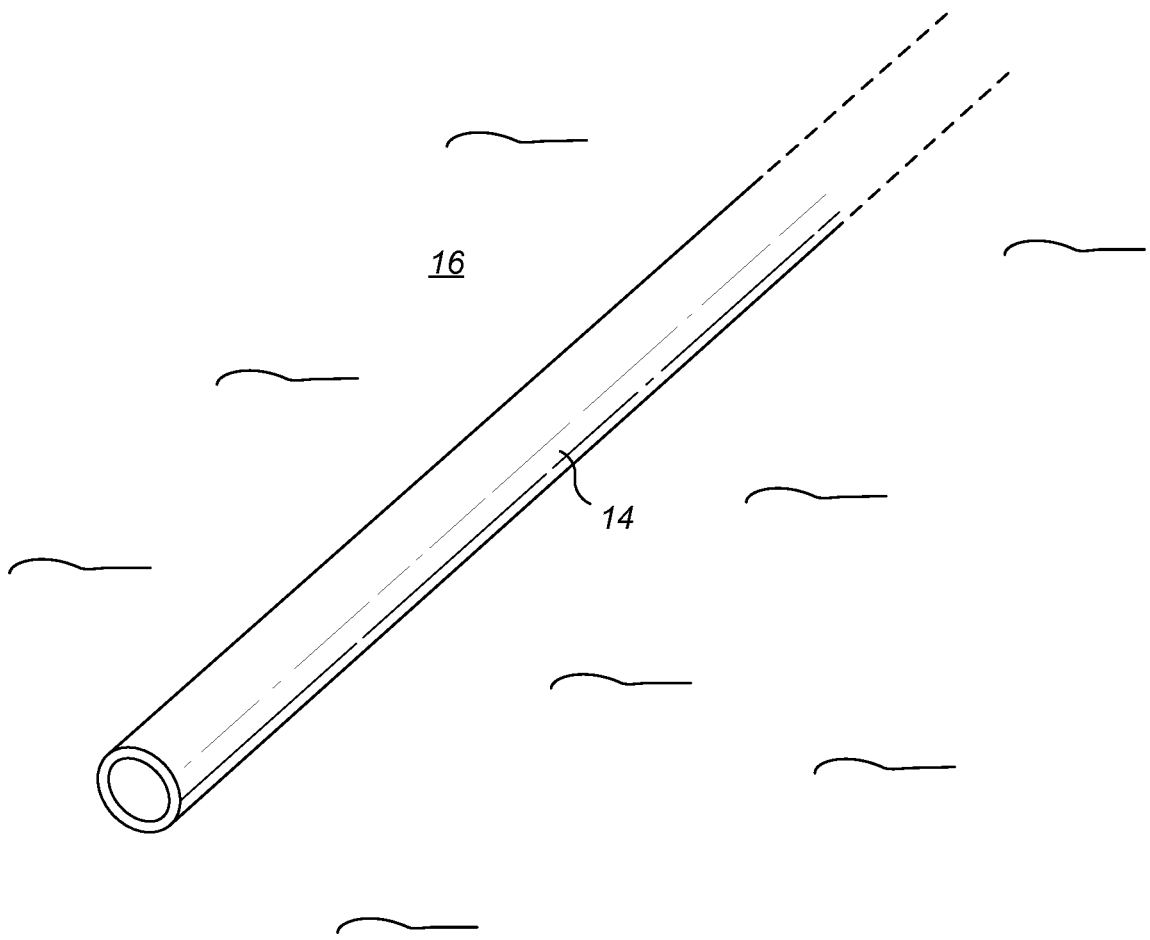
FIG. 2 is a perspective view of a subsea pipeline lying on the seabed after pre-installation.
Figure 3:
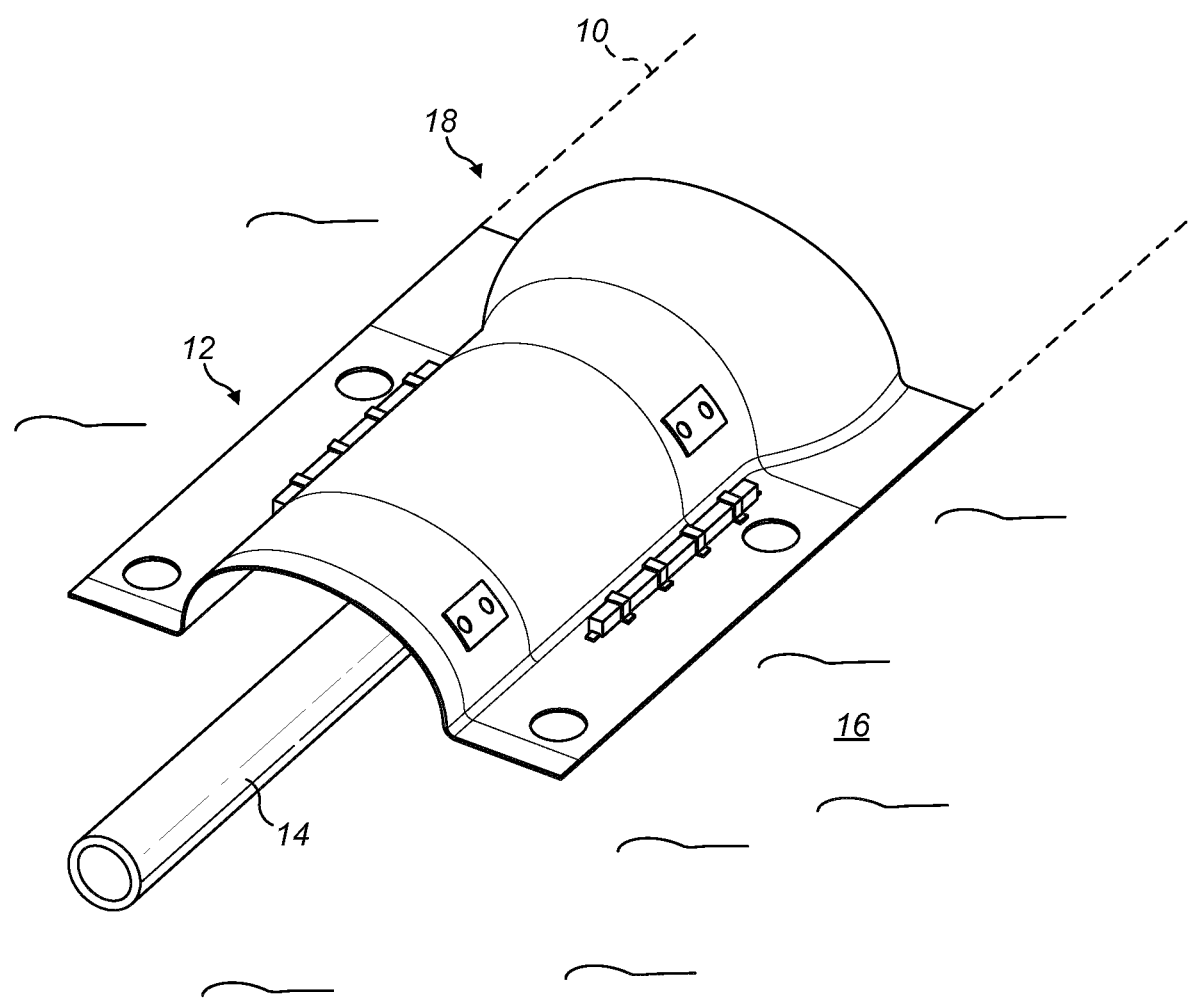
FIG. 3 is a perspective view of a cover unit of FIG. 1 laid on the seabed over the pre-installed pipeline to form part of a known cover system.
Figure 4:
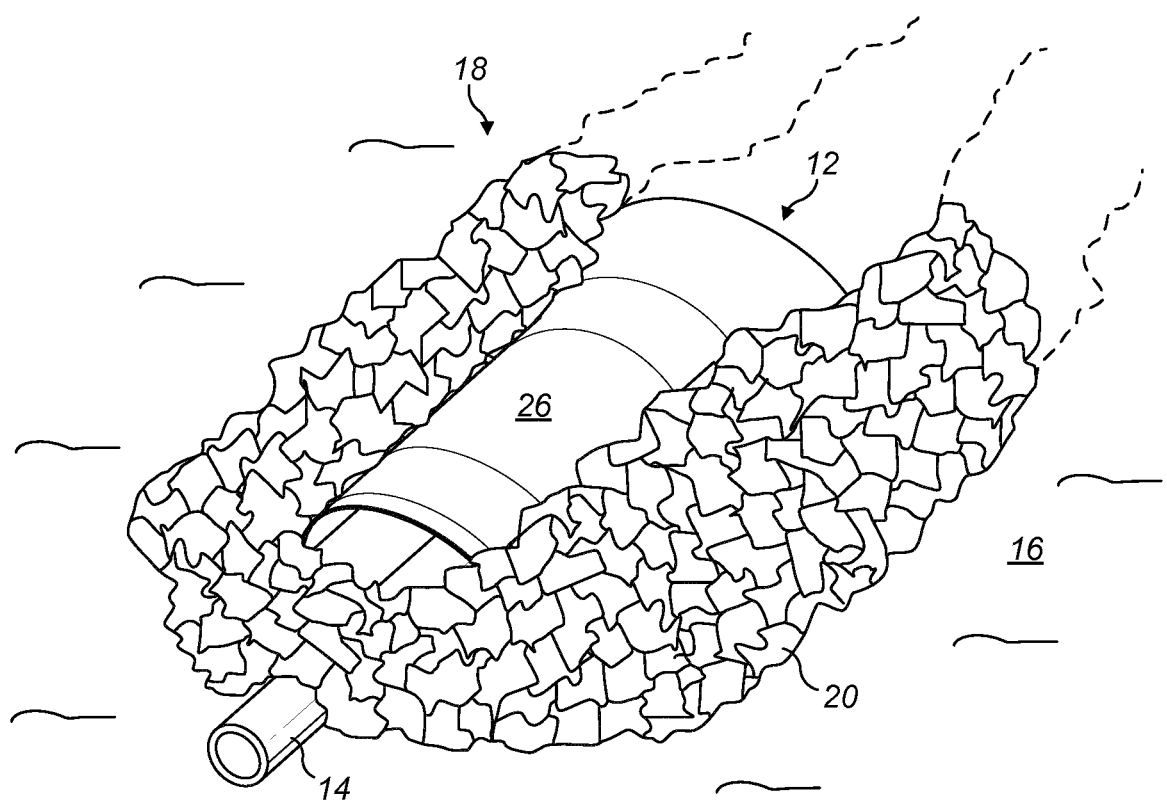
FIG. 4 is a perspective view of the cover system of FIG. 3 partially buried by a rock berm as known in the prior art.
Figure 5:
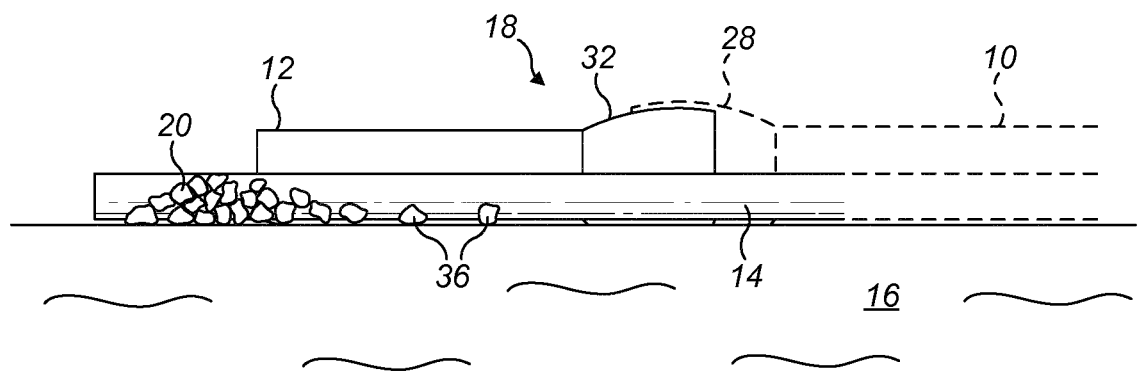
FIG. 5 is a schematic sectional side view of the partially-buried cover system of FIG. 4.
Figure 6:
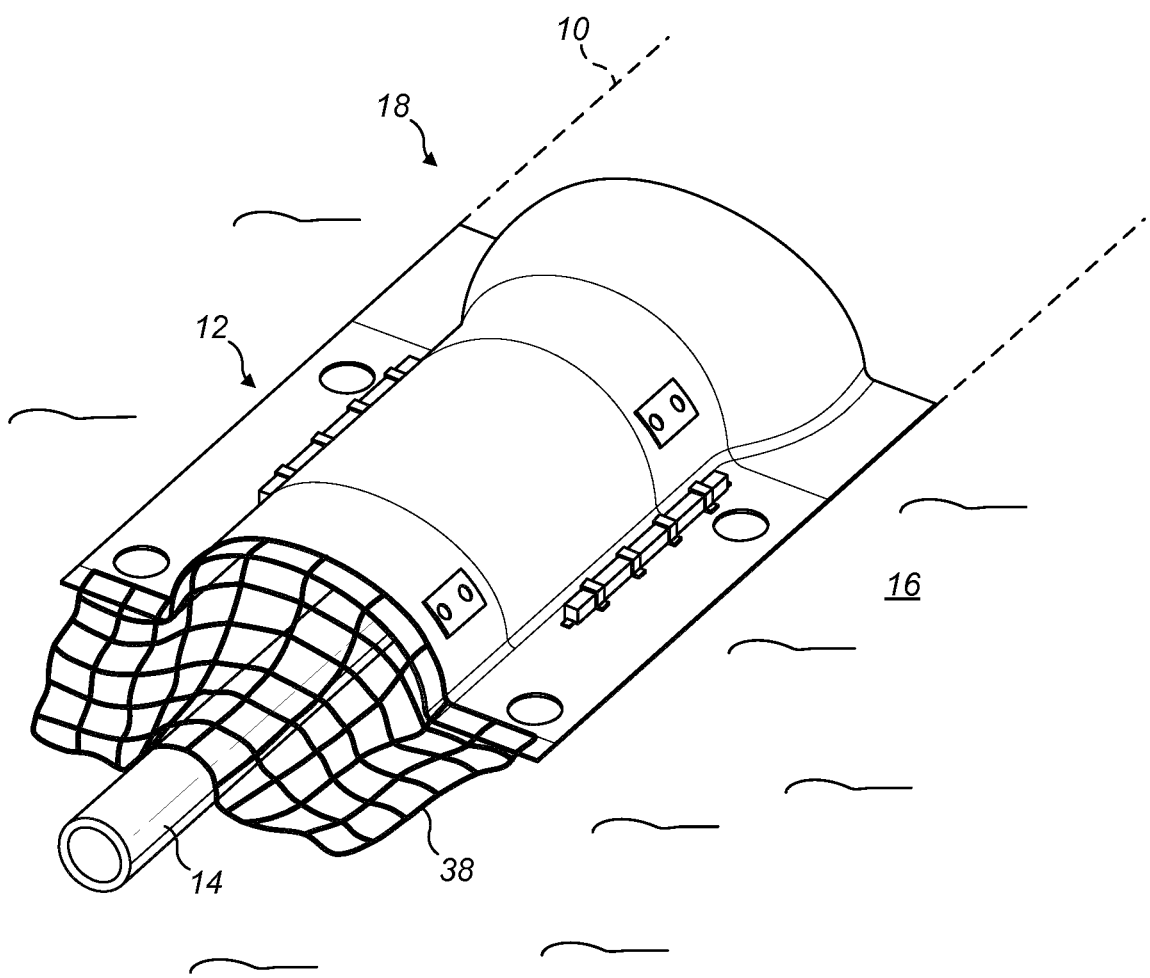
Figure 7:
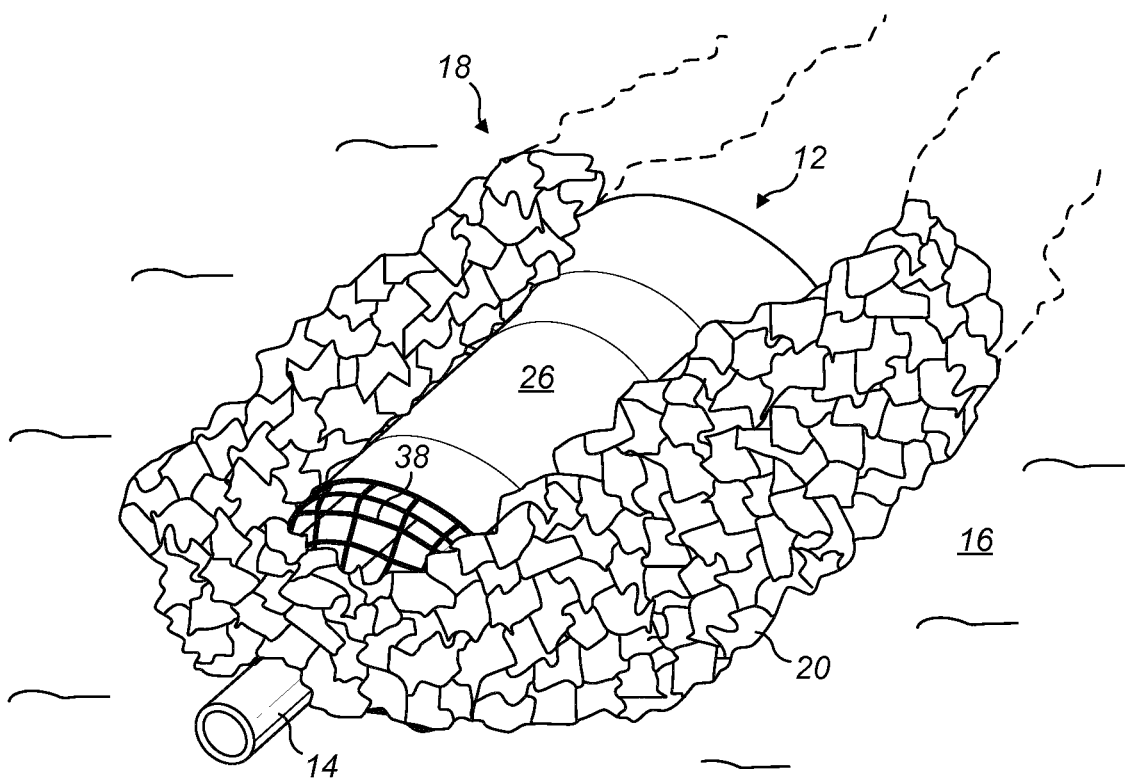
Figure 8:
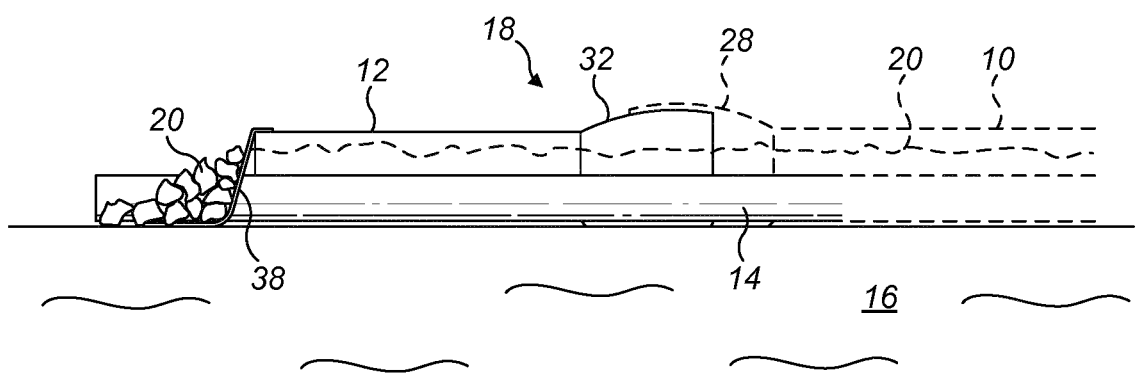
Figure 9:
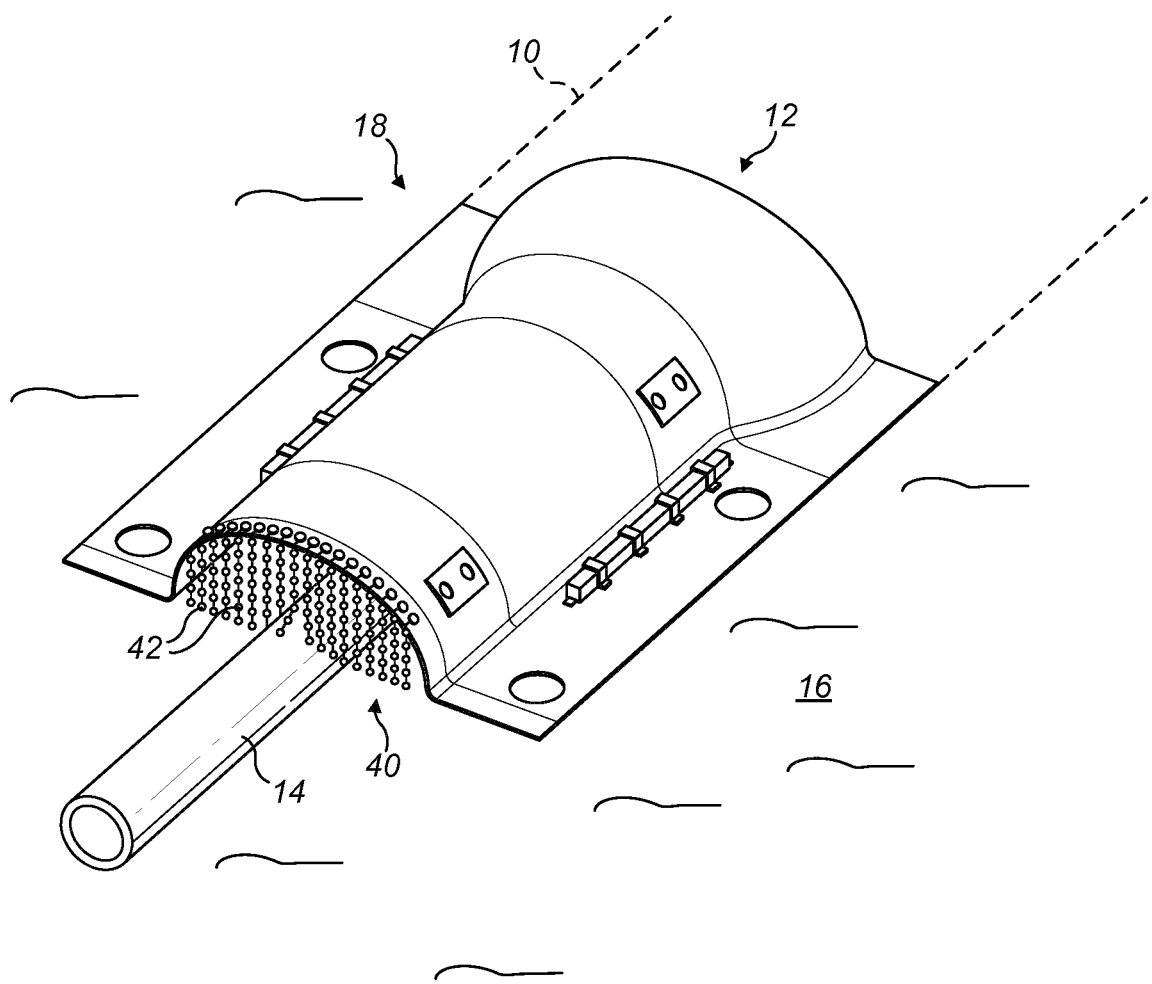

In order that the invention may be more readily understood, reference will now be made, by way of example, to FIGS. 6 to 9 of the accompanying drawings, in which:

FIG. 6 is a perspective view corresponding to FIG. 3 but showing the cover unit adapted by the addition of a net barrier across its open end in accordance with the invention;

FIG. 7 is a perspective view corresponding to FIG. 4, showing the adapted cover unit partially buried by a rock berm;

FIG. 8 is a schematic sectional side view corresponding to FIG. 5 but showing the adapted cover unit of FIGS. 6 and 7; and FIG. 9 is a perspective view corresponding to FIGS. 3 and 6 but showing a cover unit adapted by the addition of a chain barrier across its open end in accordance with the invention.

For ease of understanding, like numerals are used for like parts in FIGS. 6 to 9.

Turning next, then, to FIGS. 6 to 8 of the drawings, a cover system 18 is adapted in accordance with the invention by the addition of a mesh or net 38 to the open end of the end unit 12. The net 38 is an example of a drapable sheet that serves as a flexible conforming barrier extending across and closing the open end, while allowing water to flow through the barrier and under the cover system 18. The net 38 is of flexible strands in criss-cross relation that may be made of metal wire, cable or rope, or of plastics such as polypropylene, which may be woven, twisted and/or reinforced by fibres.

One end of the net 38 is secured around the open end of the end unit 12 and also, preferably, to the tops of the foundation parts 34 adjacent to the open end as shown. The other end of the net 38 drapes over and surrounds the pipeline 14 and extends flat across a small area of the seabed 16 beside the pipeline 14 as shown in FIG. 6.

When the rock berm 20 is subsequently dumped around, over or against the cover system 18 as shown in FIGS. 7 and 8, some rocks 36 of the berm 20 lie upon the part of the net 38 that lies flat against the seabed 16. Beneficially, this anchors or stabilises the net 38 against sliding movement relative to the seabed 16. Other rocks 36 of the berm 20 that lie against the remainder of the net 38 can therefore place the net 38 under tension as shown in FIG. 8, without penetrating or bypassing the net 38.

Where the net 38 is secured also to the tops of the foundation parts 34 adjacent to the open end as shown, this has the advantage that the weight of the berm 20 beside the cover system 18 also helps to stabilise the net 38 to both sides of the open end.

The mesh size of the net 38 is selected to prevent all, or substantially all, of the graded rocks 36 of the berm 20 passing through the net 38. It will be apparent that the net 38 closes the open end of the cover system 18 but also lies closely against the pipeline 14 and the adjacent seabed 16. This leaves no gaps around the pipeline 14 through which rocks 36 of the berm 20 can bypass the barrier defined by the net 38 to enter the interior of the cover system 18.

The flexibility of the net 38 allows the net 38 to compensate for a range of lateral positions of the pipeline 14 relative to the cover system 18, not just during installation but also in use if the pipeline 14 moves laterally under the cover system 18. The flexibility of the net 38 allows it to move with the pipeline 14 and to continue conforming to and surrounding the pipeline 14.

The net 38 may be attached to the end unit 12 before or after installation of the cover system 18 on the seabed 16. It is most convenient to attach the net 38 to the end unit 12 at the surface before installation and to lower the end unit 12 and the attached net 38 together into the sea. For example, the end unit 12 may be installed with the attached net 38 in a compact furled or folded configuration, and then the net 38 may be deployed on the seabed 16 by unfurling or unfolding it over the pipeline 14 and the seabed 16, with intervention of a diver or ROV as appropriate.

Turning finally to FIG. 9 of the drawings, this shows a variant of the invention in which a flexible conforming barrier is defined by a curtain 40 of flexible fingers 42. The fingers 42 are exemplified here by steel chains that hang from the top of the open end of the end unit 12. Again, this barrier extends across and closes the open end, while allowing water to flow through the barrier and under the cover system 18.

The fingers 42 have a stiffness or weight chosen to drape, flex or deflect around the pipeline 14, both during installation of the cover system 18 and as the pipeline 14 moves laterally in use relative to the cover system 18. The fingers 42 remain close enough together that they prevent gaps opening between themselves or around the pipeline 14 that are large enough to allow rocks 36 of the berm 20 to penetrate or bypass the barrier. The stiffness or weight of the fingers 42 also resists inward pressure from the berm 20 across the barrier. There may be a succession of such curtains 40 in the longitudinal direction to provide multiple barrier layers of fingers 42.

The invention claimed is:

1. A protective cover for a subsea elongate element, the cover having:
   an open end; and
   a barrier attached to the cover to extend across and close the open end;

wherein the barrier is flexible to conform to and surround an elongate element extending from under the cover and out from under the barrier; and wherein the barrier comprises at least one drapable sheet, net or mesh attached to the cover around the open end.

2. The cover of claim 1, wherein the barrier extends beyond a boundary of the open end to define an anchor portion of the barrier, which anchor portion is arranged to lie on an area of seabed adjacent to the open end.

3. A subsea installation comprising the cover of claim 1 in combination with an elongate element that extends along and is protected under the cover and that protrudes through the barrier.

4. The installation of claim 3, further comprising a rock berm atop or beside the cover, which berm extends onto an anchor portion of the barrier that lies on an area of seabed adjacent to the open end.

5. A protective cover for a subsea elongate element, the cover having:

an open end; and a barrier attached to the cover to extend across and close the open end;

wherein the barrier is flexible to conform to and surround an elongate element extending from under the cover and out from under the barrier; and wherein the barrier comprises at least one flexible curtain extending across the open end.

6. The cover of claim 5, wherein the barrier extends beyond a boundary of the open end to define an anchor portion of the barrier, which anchor portion is arranged to lie on an area of seabed adjacent to the open end.

7. A subsea installation comprising the cover of claim 6 in combination with an elongate element that extends along and is protected under the cover and that protrudes through the barrier.

8. The installation of claim 7, further comprising a rock berm atop or beside the cover, which berm extends onto an anchor portion of the barrier that lies on an area of seabed adjacent to the open end.

9. A method of protecting a subsea elongate element, comprising:

installing a protective cover on the seabed over the element pre-installed on the seabed, with the element protruding from an open end of the cover; and conforming a flexible barrier with the element extending out from under the barrier, the barrier surrounding the element and closing the open end of the cover;

wherein the barrier comprises at least one drapable sheet, net or mesh attached to the cover around the open end.

10. The method of claim 9, comprising placing a rock berm atop or beside the cover, the rock berm extending onto an anchor portion of the barrier that lies on an area of seabed adjacent to the open end.

11. The method of claim 10, comprising allowing the element to move laterally under the cover while the flexible barrier continues to conform with and surround the element.

12. The method of claim 11, comprising installing the cover with the barrier already attached to the cover.

13. The method of claim 9, comprising allowing the element to move laterally under the cover while the flexible barrier continues to conform with and surround the element.

14. The method of claim 9, comprising installing the cover with the barrier already attached to the cover.

15. A method of protecting a subsea elongate element, comprising:

installing a protective cover on the seabed over the element pre-installed on the seabed, with the element protruding from an open end of the cover; and conforming a flexible barrier with the element extending out from under the barrier, the barrier surrounding the element and closing the open end of the cover;

wherein the barrier comprises at least one flexible curtain extending across the open end.

* * * * *